Feb. 21, 1950
E. C. TAYLOR
CURRENT-CONTROL APPARATUS FOR
POTENTIAL-MEASURING APPARATUS
Filed Sept. 21, 1945
2,497,918
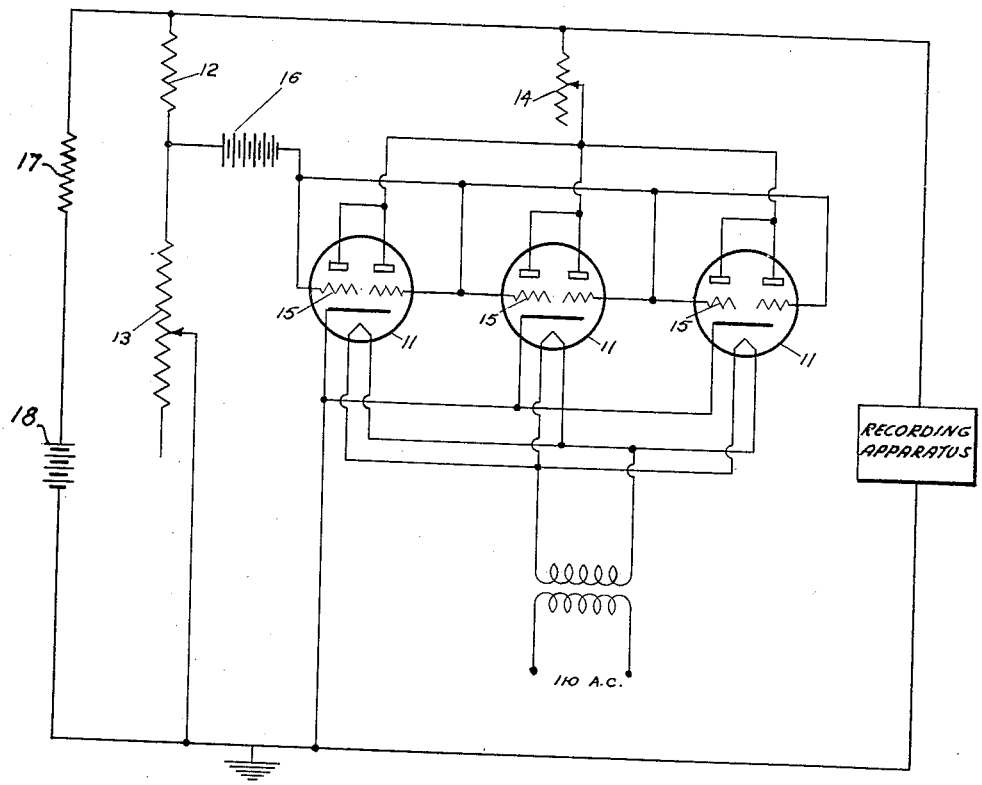
INVENTOR.
Edward C. Taylor
BY
Ralph L Chappell
ATTORNEY Patented Feb. 21, 1950

2,497,918

UNITED STATES PATENT OFFICE 2,497,918

CURRENT-CONTROL APPARATUS FOR POTENTIAL-MEASURING APPARATUS

Edward C. Taylor, Valley Stream, N. Y.

Application September 21, 1945, Serial No. 617,903

6 Claims. (Cl. 171—95)

(Granted under the act of March 3, 1883, as amended April 30, 1928; 370 O. G. 757)

This invention relates in general to an electrical circuit and in particular to a by-pass electric circuit adapted to maintain a substantially constant electric voltage and current flow.

In various types of electrical work, such as for example in making electrical measurements, it is frequently desirable to permit minor fluctuations of current and voltage and yet to prevent a major change therein. For example, it is sometimes necessary to make electrical measurements which contemplate determining and recording relatively small fluctuations in electrical characteristics, which require comparatively sensitive electrical measuring and recording devices, and yet at the same time it is necessary to protect this delicate equipment against sudden surges of current such as might be caused by opening or closing an imperfect electric contact. Such a situation is disclosed in copending application, Serial No. 617,902, entitled "Apparatus for electrically measuring strain applied in testing strength of materials," and filed concurrently herewith by William H. Hoppman, II, and Edward C. Taylor, now Patent No. 2,475,614, patented July 12, 1949, wherein there is described a method and apparatus for determining electrically the forces acting on a moving body. This method and apparatus includes use of sliding electrical contacts and therefore gives rise to sudden changes in the electrical characteristics of the system because of the separation between these sliding contacts. It is necessary to assure that these changes in electrical characteristics are discounted as fully as possible, and accordingly it is an object of this invention to provide a means to maintain a substantially even current flow through a segment of an electric circuit containing a variable resistance.

Another object is to provide apparatus for maintaining a substantially steady voltage between two points in an electric circuit.

Another object is to provide apparatus for maintaining a substantially regular current flow in a segment of an electric circuit, which apparatus is energized by a relatively large change in current flow and which is unaffected by a relatively small change therein.

An additional object is to provide a method and apparatus for regulating the flow of current through a segment of an electric circuit.

Further objects and advantages of this invention as well as its construction, arrangement and operation, will be apparent from the following description and claims in connection with the accompanying drawing, the single figure of which shows a wiring diagram of the current and voltage control apparatus according to one embodiment of this invention.

In the figure there is shown a current and voltage control apparatus comprising one or more vacuum tubes 11 placed in an electric circuit as is hereinafter described. A fixed resistance 12 is placed in series with a variable resistance 13 variations of which produce voltage fluctuations that are measured. This variable resistance 13 may, for example, be a series of measuring electric gages placed between sliding contacts as is disclosed in hereinbefore mentioned Patent No. 2,475,614; alternatively it may be another type of electric equipment such as, for example, a motor, relay, rheostat, varying resistance electronic devices, or the like. The varying characteristic of this resistance 13 may be represented by a deliberately controlled variation such as, for example, in a rheostat, by an experimental phenomenon or by an interruption of a circuit, such as for example, an imperfect electrical contact.

Resistance 12 is preferably a fixed resistance or at least a resistance of slight variation. Its value is so selected that the voltage drop across this resistance in the normal course of operation is in the general range of the critical cut-off voltage of the grid bias of tubes 11. In other words, resistance 12 is so selected that the voltage drop across this resistance is of such a value that its addition to or subtraction from the grid bias is sufficient to swing the grid bias either above or below the cut-off voltage.

Vacuum tubes 11 are placed in the electric circuit so that the plate current in these tubes is in parallel with the current through resistance 12 and 13. Variable resistance 14 is optionally and preferably in series with these tubes 11, and this resistance preferably being so selected and adjusted that the plate current which may be carried through the tubes 11 is substantially equal to the current carried by resistance 13 in its normal operation.

The grids 15 of tubes 11 are biased to a power source 16 which is so selected that under normal operation these tubes are operating slightly below the cut-off voltage and accordingly are carrying substantially no plate current.

As an illustration of the operation of this invention, the following specific example is given to show a particular electric circuit in which this invention is adapted to operate. It is to be understood that the invention is not to be limited to the specific features described in this example,

Example

One or more standard 6N7 tubes are arranged with their plate currents in parallel electric circuit as indicated by tubes 11 in Figure 1. This bank of tubes in turn is placed in parallel with a 125 ohm resistance (resistance 12 in the drawing) and a 2,000 ohm resistance (resistance 13) which is in series with resistance 12. A switch or sliding contact (not shown in the drawing, but indicated by the variable nature of resistance 13) is placed in series with these resistances.

The grid 15 of tubes 11 is biased to the negative side of an 86 volt battery (power source 16) the positive side of which is in turn connected between resistance 12 and resistance 13. This entire electric circuit, as shown, is connected through a 2375 ohm fixed resistance 17 to a positive side of 180 volt direct-current power source 18.

In the normal operation of this circuit the voltage drop across resistance 13 is 80 volts and accordingly the grid bias is minus six volts. Likewise, the normal voltage drop across resistance 12 is approximately 5 volts.

When the flow of current through resistance 13 is interrupted, the voltage drop across resistance 12 automatically ceases and accordingly the grid is then biased at minus 1 volt. This grid bias is sufficiently high to permit the flow of a plate current through tubes 11, and at the same time it is a negative grid bias thereby avoiding the complications caused by a neutral or positively biased grid, and avoiding the flow of a grid current. Variable resistance 14 is then adjusted if necessary so that the plate current is substantially equal to the normal current flow through resistance 13.

While this circuit is in operation, a reasonably small variation of resistance 13, for example, a variation of several volts, is insufficient to raise the grid bias above the cut-off value and accordingly does not bring the by-pass circuit into operation. On the other hand, a large variation in resistance 13 such as, for example, the interruption of the circuit at a point in resistance 13 causes the by-pass circuit to be energized, and accordingly the circuit carries roughly the same current despite wide variations in resistance 13. Nevertheless minor variations in current flow through resistance 13 may be noted in measuring and recording equipment made a part of the circuit.

A wide variation in the characteristics of the by-pass circuit can be obtained by varying resistance 12 and power source 16. As described in Example 1, these may be so selected that the grid bias is well below the cut-off voltage, and in such a case a comparatively wide current change is needed to actuate the by-pass circuit. Alternatively, the grid may be biased slightly above the cut-off voltage, in which case any change whatsoever in the current through resistance 12 is accompanied by a compensating change of current in the by-pass circuit.

The sensitivity of the control of the by-pass circuit also may be determined by the selection of resistance 12. The selection of a high value for this resistance increases the response of the by-pass circuit to such an extent that overcompensation may be obtained. On the other hand, resistance 12 may be so selected that the sensitivity of response of the by-pass circuit is extremely small and gives only partial compensation for wide variations in current through the resistance. Accordingly, wide latitude of choice is available within the bounds of the invention, and a wide variety of problems may be solved thereby.

This by-pass circuit is of particular value when relatively delicate or sensitive measuring apparatus is applied to the circuit as indicated in the drawing, but not shown in detail. The by-pass circuit permits the use of sufficiently delicate measuring or recording apparatus to detect minor changes or variations in resistance 13 and yet eliminates the possibility of permanent damage or temporary jamming of this measuring equipment by interruptions in the circuit.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A by-pass circuit comprising a grid controlled vacuum tube connected in parallel with a segment of an electric circuit containing at least one varying resistance and at least one fixed resistance, the grid of said tube being biased to a point in the circuit between the fixed resistance and the varying resistance through a direct current potential source so selected that the grid bias of the tube is below the cut-off voltage while normal current is flowing through the fixed resistance and the grid bias is above the cut-off voltage when the current through the fixed resistance is substantially lowered, whereby a compensating current is caused to flow through said tube.

2. Apparatus for measuring low-current-value potential changes comprising a source, a resistance connected across said source and normally subject to variations to produce potential fluctuations to be measured, electrical measuring apparatus in circuit with the resistance for indicating said fluctuations, a by-pass circuit in parallel with said resistance and comprising a vacuum electron discharge device having a grid, and biasing means including a resistor in series with said resistance and a battery in series with the grid, said battery being connected at the junction of said resistance and said resistor, whereby the grid bias is normally below cut-off when the resistance circuit is closed and above cut-off when current through said resistance is interrupted.

3. The apparatus as in claim 2 further characterized by means in said by-pass circuit for controlling the current therein in the conducting state to a value substantially equal to that in the resistance circuit before interruption thereof.

4. A by-pass circuit comprising a grid-controlled vacuum tube connected in parallel with a segment of an electric circuit containing at least one variable resistance and at least one fixed resistance, the grid of said tube being biased to a point in the circuit between the fixed resistance and the variable resistance through a direct-current potential source so selected that the grid bias of the tube is below cut-off while normal current is flowing through the fixed resistance and the grid bias is above cut-off when the current through the fixed resistance is substantially lowered in response to open circuiting of the variable resistance, whereby a current is caused to flow through said tube substantially equal to that flowing in the variable resistance during the closed-circuit condition thereof.

5. In a potentiometric arrangement wherein a resistance element is adapted to have an electric current maintained therein, and the resistance of said element is subject to variations in accordance with variations of a condition, thereby to produce corresponding variations in potential at the terminals of said element, the combination comprising means connected to said element for indicating the potential variations, a circuit connectible across the element and including a grid-controlled vacuum tube, and biasing means for said tube comprising a resistor in series with said element and a source of potential in series with the grid, said source being connected to the junction of said element and said resistor.

6. The arrangement as in claim 5, wherein said element is subject to an open-circuited condition to interrupt the flow of current therein, said circuit further comprising means operable when said element is open-circuited to control the current flow in said circuit to a value substantially equal to the current in said element before open-circuiting thereof.

EDWARD C. TAYLOR.

REFERENCES CITED

The following references are of record in the file of this patent:

UNITED STATES PATENTS

| Number | Name | Date |
| --- | --- | --- |
| 1,487,108 | Knoop | Mar. 18, 1924 |
| 1,971,146 | Rouere et al. | Aug. 21, 1934 |
| 2,008,855 | Drobish | July 23, 1935 |
| 2,079,485 | Bousman | May 4, 1937 |
| 2,218,629 | Swart | Oct. 22, 1940 |
| 2,372,432 | Keizer | Mar. 27, 1945 |
| 2,373,997 | Boykin | Apr. 17, 1945 |
| 2,391,801 | Schade | Dec. 25, 1945 |
| 2,451,953 | Ingram | Oct. 19, 1948 |

OTHER REFERENCES

Bialous et al.: General Electric Review, May 1941; pages 263–264.